Oct. 27, 1970  J. J. TAYLOR  3,535,854
CENTRIFUGAL DUST SEPARATOR
Filed Aug. 29, 1968  2 Sheets-Sheet 1
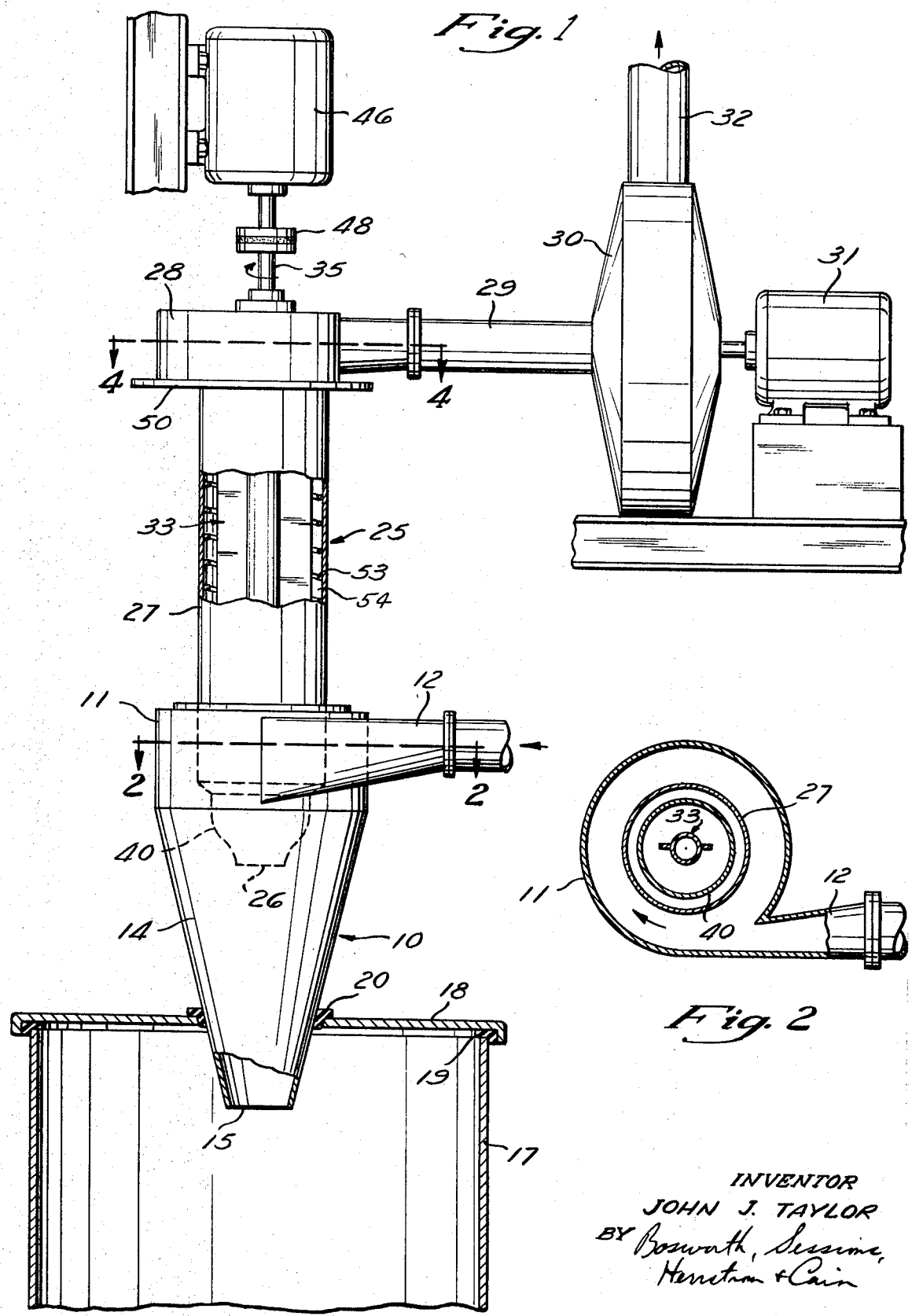
INVENTOR
JOHN J. TAYLOR
BY Bosworth, Sessions, Herrström & Cain
ATTORNEYS

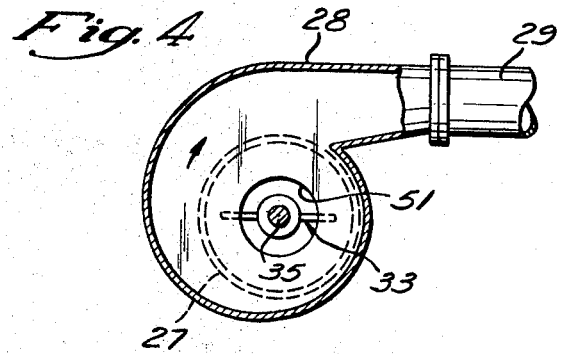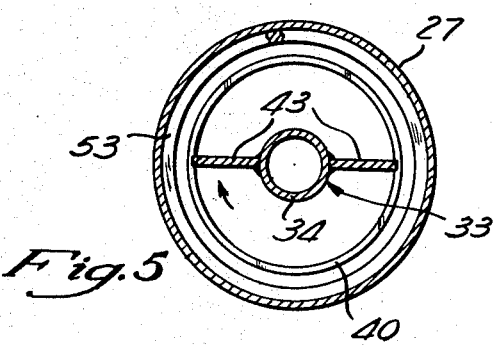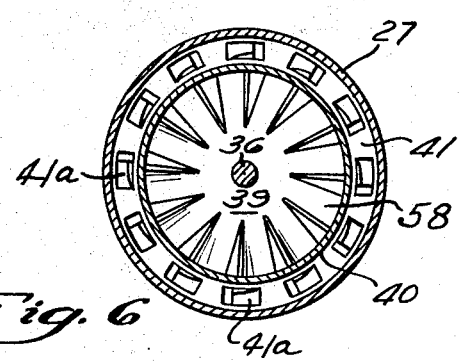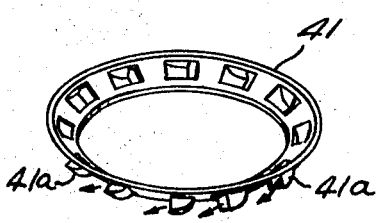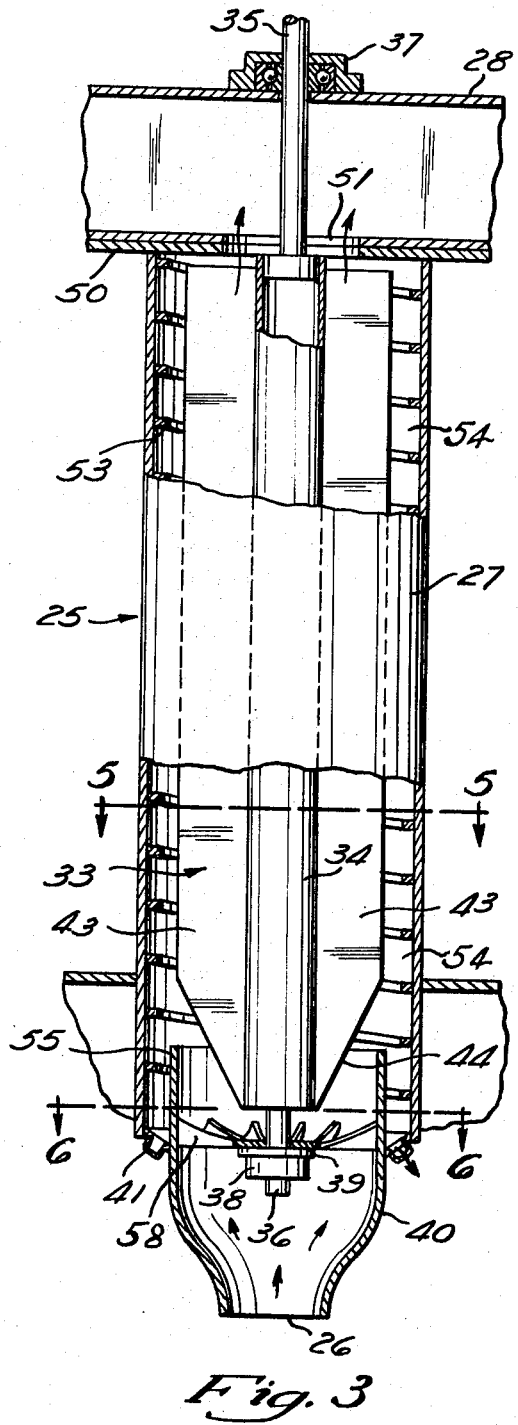

United States Patent Office 3,535,854
Patented Oct. 27, 1970

3,535,854
CENTRIFUGAL DUST SEPARATOR
John J. Taylor, 539 S. San Marcos Road,
Santa Barbara, Calif. 93105
Filed Aug. 29, 1968, Ser. No. 756,104
Int. Cl. B01d *45/12;* B04c *5/04*
U.S. Cl. 55—338                                 4 Claims

ABSTRACT OF THE DISCLOSURE

A dust separator for removing very fine solid particles from a gas. The dust-laden gas is first passed through a separator of the vortex type, for example, a cyclone. The gas flows from the cyclone through an elongated cylindrical housing, the entry end of which is the discharge port of the cyclone. The housing contains a coaxial impeller having radially extending vanes. The impeller is driven at high speed so that the gas passes through the housing in a helical path, causing solid particles carried by the gas to be thrown outwardly against the inner wall of the housing. The inner wall of the housing has means defining a helical path extending from the exit end to the entry end the housing. This path is of opposite hand to the helical path taken by the gas passing through the housing so that solid particles thrown against the inner wall by the impeller are caused to move to the entry of the housing where the solid particles are discharged into the housing of the cyclone.

BACKGROUND OF THE INVENTION

This invention relates to centrifugal dust collectors in which very fine solid particles that are entrained in a gas are separated from the gas by the action of centrifugal force. More particularly, the invention relates to the combination, with a separator or collector of the vortex type, e.g., a cyclone, of a dust separator which is adapted to take the gas that has passed through the collector and subject it to a further centrifugal separating action in which the gas and entrained fine particles leaving the vortex-type separator are subjected to very high centrifugal force whereby a high percentage of the remaining solid particles, including extremely fine particles, are separated from the gas and returned to the vortex-type collector.

Dust separators or collectors of the vortex type, known usually as cyclones, are well known. In these the gas to be cleaned enters the cylindrical upper portion of a housing in a tangential path, causing the air to whirl in its passage through the housing which causes the solid particles to go toward the periphery of the housing. The exit from the housing is located on its axis and the air withdrawn from the central portion of the housing is reasonably free from heavier and larger particles of dust or other contaminants. The particles which are thrown toward the outer wall of the housing fall downwardly and are usually collected in a drum or barrel disposed below a conical lower portion of the housing.

Separators of this type are effective for relatively coarse particles, for example, those having transverse dimensions of forty to one hundred microns or more, but they are ineffective for smaller particles and are almost useless for particles having dimensions of, for example, one to ten microns. Various attempts have been made to improve the action of centrifugal separators of the vortex type; see, for example, the Osgood Pat. Nos. 2,349,831 and 2,153,270. Power driven impellers have also been used in dust separators as shown by the Carlstrom Pat. No. 2,093,082 and the Putney Pat. No. 2,453,593. So far as I am aware, however, these have not been successful in removing very small particles from gases and where the discharge of quite clean air or other gas is required, electronic precipitators or filters such as bag-type collectors following the vortex-type separators have been found to be necessary.

SUMMARY OF THE INVENTION

A general object of the present invention is to provide a dust separator or collector of the centrifugal type having the ability to remove a high percentage of very small solid particles from a gas passing through it. Other objects are the provision of a centrifugal dust separator in which the consumption of power is not excessive, the provision of a dust separator that can be manufactured at reasonable cost, the provision of a dust separator of relatively simple and compact construction and the provision of a dust separator that is long-lived and free from trouble in service.

Briefly, I accomplish these and other objects of the invention by the provision of an apparatus that embodies a dust separator of the vortex type having an inlet for dust-laden gas extending tangentially into a housing near the top of the housing, an outlet for solids that have been separated from the gas at the bottom of the housing, and a central outlet for gas, contaminated by residual solids in combination with a centrifugal separator, the outlet of the vortex separator constituting the inlet of the centrifugal separator. The centrifugal separator has an elongated cylindrical housing that is coaxial with the vortex separator and that contains a coaxial impeller that is driven at high speed so that air passing through the cylindrical housing travels in a helical path through the housing and solid particles are subjected to very large centrifugal forces and are thrown outwardly toward the inner wall of the housing. The inner wall of the housing is provided with a helical track that extends from the top to the bottom of the housing and is of opposite hand to the helical path taken by the gas passing through the housing whereby the solid particles thrown out to the inner wall by the impeller move downwardly to the bottom end of the housing where they are returned to the vortex separator in an annular zone surrounding the exit from the vortex separator and inlet to the cylindrical housing. These particles are ultimately discharged with the particles previously separated by the vortex-type collector, while the air that is returned to the vortex-type collector with the particles is recirculated through the centrifugal separator.

BRIEF DESCRIPTION OF THE DRAWINGS

Referring to the drawings:

FIG. 1 is an elevation with parts broken away showing a dust collecting apparatus embodying my invention;

FIG. 2 is a horizontal section taken along the line 2—2 of FIG. 1;

FIG. 3 is an enlarged vertical sectional view through the centrifugal separator component of the apparatus of FIG. 1;

FIG. 4 is a horizontal section taken along line 4—4 of FIG. 1;

FIGS. 5 and 6 are horizontal sections taken along the lines 5—5 and 6—6, respectively, of FIG. 3;

FIG. 7 is a perspective of a supporting member employed in the apparatus.

DESCRIPTION OF THE PREFERRED EMBODIMENTS

As shown in FIG. 1, a preferred embodiment of my invention comprises a vortex-type dust collector indicated in general at 10 and having a housing having a cylindrical upper portion 11 into which dust-laden gas is conveyed through an inlet conduit 12 that extends tangentially into the portion 11 as shown in FIG. 2. Beneath the cylindrical portion 11 there is a frusto-conical portion 14 which terminantes in an outlet 15 for the solid material that is separated from the incoming gas. The restricted portion 15 may be constantly open or may be provided with a valve that is opened as required to discharge solid material collected in the frusto-conical part 14 of the collector 10. The collector 10 may be mounted on any convenient kind of hopper or container 17 having a lid 18 which is provided with a flexible seal 19 around the upper edge of the container 17 and a flexible seal 20 around the exterior of the concial portion 14. Tight seals at these zones are important for efficient operation. It will be evident that the collector 10 takes the form of a conventional cyclone.

The dust-laden gas entering the collector 10 through the tangential conduit 12 whirls around the interior of the cylindrical portion 11 and the frusto-conical portion 14. This action causes the heavier solid particles entrained in the stream of gas to go toward the inner surface of the collector housing; these particles travel downwardly through the conical portion of the housing and are ultimately discharged into the hopper 17. Gas, which still carries a substantial portion of the finest particles that were entrained in it, flows out of the central portion of the housing 11 into a centrifugal separator indicated in general at 25 and having an entry port 26 which also constitutes the exit or discharge port for the collector 10. Centrifugal separator 25 has an elongated cylindrical housing 27 through which the gas flows upwardly in the arrangement shown in the drawings to an exit chamber 28 of conventional scroll shape which leads to a conduit 29 that, in the embodiment shown, is connetced to a blower 30 driven by a motor 31, the blower 30 discharging the gas into a discharge conduit 32. The interior of the cyclone and the separator 25 are below atmospheric pressure because of the action of the blower. In its passage through the centrifugal separator 25 a high percentage of the solids remaining in the gas after passing through the vortex-type collector 10 is removed and in many circumstances it is possible to discharge the gas from the conduit 32 or conduct it to another point of use without further cleaning operations and without passage through a filter or electronic precipitator.

The construction whereby this desirable result is accomplished by the combined action of the collector 10 and the centrifugal separator 25 is shown particularly in FIGS. 3 to 7 of the drawings. As shown in these figures, the housing 27 is simply an elongated cylindrical member that has a length several times its diameter. For example, in a preferred form of the invention, the length of the housing 27 is from two to four times its internal diameter. In order to cause the gas passing through the housing to travel in a helical path and thus to subject the gas and the solid particles entrained in it to high centrifugal forces, an impeller 33 is disposed within the housing. Impeller 33 is mounted for rotation about an axis coincident with the axis of the housing and extends for substantially the entire length of the housing. The impeller comprises a central shaft 34, such as a length of steel pipe having a drive shaft 35 and a stub shaft 36 suitably secured in its upper and lower ends, respectively.

Shafts 35 and 36 are supported by appropirate bearings 37 and 38. Bearing 37 is supported by the scroll housing 28 while the lower bearing 38 is supported by an entry plate 39 carried by the inlet member 40 which, in turn, is supported from the lower end portion of the housing 27 by a supporting member 41. The construction of the members 39, 40 and 41 is described in greater detail below.

Impeller blades 43 are suitably attached to the central shaft 34 diametrically opposite to each other. The blades extend from near the top of the housing member 27 to a zone a little beyond the lower end of it, the lower portions of the blades preferably being tapered as shown at 44 so that the lower ends of the blades can project into the inlet member 40. The blades 43 are preferably made of sheet aluminum in order to reduce their weight, and the entire assembly is carefully balanced so that it can be rotated at high speed without excessive vibration. Two blades are shown but more than two can be employed if desired. The impeller is driven by a motor 46 through a coupling 48.

At the upper end of the housing 27, the scroll housing 28 is supported upon a plate 50 having an opening 51 therein that provides a restricted orifice leading to the scroll housing 28, exit conduit 29 and blower 30. Thus, the gas, after passing through the housing 27, is constrained to leave the housing through the exist port 51 which is an annular opening surrounding the central shaft 34 of the impeller 33. Since the action of the impeller causes particles denser than the gas to travel toward the inner wall of the housing 27 and away from the central shaft 34, this exit orifice assists in the separation of the particles from the gas at the final point of discharge of the gas from the centrifugal separator.

As noted above, the rapid rotation of the impeller results in the particles entrained in the gas flowing through the housing 27 to be subjected to very high centrifugal forces of several thousand g. Thus, during the time that the gas is flowing through the housing 27, a high percentage of the particles entrained in the gas are thrown out into engagement with or into a position very close to the inner wall of the housing. In order to cause these particles to travel to the entry or lower end of the housing 27 so that they can be returned to the collector 10 and ultimately discharged into the hopper 17, the inner surface of the housing is provided with means defining a recessed helical path extending from the top to the bottom of the housing with the helix being of opposite hand to the helical path taken by the major portion of the gas in its passage trough the housing. Thus, as shown in the drawings, the housing 27 may be provided with an internal helical thread 53 that defines a recessed helical path 54 extending from the exit end of the housing immediately beneath the orifice plate 50 to the entry end of the housing immediately adjacent the support member 41. (It is to be noted that no effort has been made to draw the threads to scale.) By the provision of this path, the solid particles that are thrown outwardly into engagement with or to a zone near the inner wall of the housing 27 by the violent centrifuging action of the impeller 33 are caused to travel downwardly along the path 54. This is brought about because the circumferential components of the motion of the gas in its helical path through the housing imparts a circumferential motion to the solid particles and the thread 53 constraints the particles and a portion of the gas to follow the path 54, the portion of the gas in the path carrying with it the particles in a direction having an axial component opposite to the axial component of the movement of the major portion of the gas through the housing.

The thread 53 can be provided in various ways; for example, a wire can be wound into a coil spring of proper pitch and diameter so that it will firmly engage the interior of the housing and it can then be welded or brazed into position if desired. Thin sheet metal can be wound edgewise into a coil and similarly positioned into the housing 27. Also, for abrasive materials it may be desirable to utilize a lining composed of rubber or other elastomeric material that is molded or extruded to proper form to provide a recessed helical path.

At the lower end of the housing 27 the solid particles and the gas accompanying them are discharged in the annular space between the exterior of the inlet member 40 and the interior of the housing 27. It will be noted that the inlet member 40 has a cylindrical portion 55 that extends upwardly a slight distance within the lower end portion of the cylindrical housing 27 and, as noted above, the inlet member 40 is supported by member 41. This not only mechanically supports the inlet member 40, but is provided with vanes 41a (see FIGS. 6 and 7) that impart a circumferential combonent to the movement of gas and solid particles through the annular space. Since there is a substantial volume of gas, the velocity of the dust-laden gas as it is returned to the collector 10 is high. This circumferential component is in the direction that adds to the vortex effect in the cyclone and, of course, the flow returns the fine particles to the chamber 14 where they are eventually discharged through the lower end 15 into the hopper 17. The gas returned with the fine particles to the collector 10, the volume of which may amount to from one-eighth to one-quarter of the rated capacity of the apparatus, is eventually recirculated through the centrifugal separator 25.

The impeller 33 rotates rapidly and in order to reduce shock on the impeller blades 43 caused by the impingement of the entering air stream through the entry plate 39, the entry plate 39 has its supporting members 58 also twisted into the form of vanes that impart a whirling motion to the air entering the housing 27 through the inlet member 40. It is also to be noted that the port 26 of the inlet member 40 is reduced in diameter so that gas is withdrawn from the collector 10 primarily in the central portion of the collector where the gas is the cleanest. The gas passes at high velocity through the vanes 58 and thus is given a substantial spin component before it engages the tapered ends 44 of the blades 43 of the impeller.

This not only reduces the shock and erosion on the impeller but also assists in initiating the centrifuging action that is essential to proper separation of fine particles from the gas.

In operation, the air is drawn through my separator by the blower 30. Coarse particles are separated from the air in the vortex collector 10 and fine particles, down nearly to the size of smoke particles, are separated by the centrifugal separator 25. In order to accomplish this result the air passing through the housing 27 must be subjected to very high $g$ forces for an appreciable period of time. The forces required to move micron-sized particles through air for a reasonable distance in a short length of time are very great. Thus it may be considered that the effectiveness of the centrifugal separator is directly functional of the product of the time that is required for a given increment of gas to transverse the separator times the force in $g$'s to which the gas is subjected, and inversely functional to the radial distance through which the particles must travel in order to be separated from the main stream. For example, if the time of transit through the apparatus is 0.2 second, the force is 5000 g's and the radial distance that the particles have to travel to get out of the main stream and into the helical path 54 is two and one-half inches, we then have the following:

$$\frac{0.2 \times 5000}{2.5} = 400$$

It may be considered that such a separator has a rating of 400 "$g$-seconds per inch." Another separator having a transit time of one-quarter second and a centrifuging force of 10,000 $g$'s with a radial distance of two inches would have a rating on this basis 1250 $g$-seconds per inch. According to my experience, a separator having a rating of 100 $g$-seconds per inch will effectively remove relatively coarse particles of from 400 to 100 microns or more and a separator having a rating of 400 will remove particles much smaller than this, say, down to 20 microns. This, of course, is far better than anything that can be accomplished with an ordinary cyclone. A separator having a rating of 1000 $g$-seconds per inch will remove particles with low micron range while the separator in the second example, having a rating of about 1250 will remove particles even smaller.

In the separator given in the first example, the housing 27 is about twelve inches in diameter and sixty inches long and the impeller is driven at a speed of about 6000 r.p.m. The capacity of the separator is 600 cubic feet per minute. The separator given in the second example handles 30 cubic feet per minute, the impeller speed is 12,000 r.p.m. and the housing is four inches in diameter by eight to nine inches long.

In both devices the thread that defines the path 54 has a helical pitch of one-half inch, is about one-eighth inch thick, projects inwardly about three thirty-seconds inch and the clearance between the tips of the vanes and the inner wall of the housing 27 is preferably about one-fourth of an inch to three-eighths inch from the inner surface of the thread. Closer clearances make for high power consumption and do not increase the effectiveness of the device.

In operation the spin imparted to the entering gas by the plate 39 greatly reduces the shock on the impeller and assists in initiating the desired helical flow. The circumferential component of the flow of gas causes reverse flow of dust particles and gas in and adjacent the path 54 and when the particles and gas are returned to the vortex collector 10 through the support 41 the whirling motion greatly increases the efficiency of the vortex collector.

It will be noted that throughout the apparatus the spin imparted to the air and particles entrained in it is, in the embodiment shown, always in a clockwise direction when the apparatus is view from above. Throughout the apparatus the whirling motion of the air tends to throw solid particles away from the axis of the impeller. Thus the entering air through the inlet 12 is given a rotary motion as in a conventional cyclone. The air intake into the inlet member 40 is from the center of the vortex-type separator and this entering air has its whirling motion augmented by the vanes 58 of the member 39. The rotation of the air and entrained particles is greatly increased by the action of the impeller 33 as the air travels through the housing 27. The rotational movement of the air in the housing causes the air and entrained particles within the path 54 to travel downwardly along the inner wall of the housing and ultimately to be discharged through openings in the supporting member 41 where the air and solid particles are deflected again in the clockwise direction by the vanes 41a. The motion of the gas discharged through the supporting member 41 adds to the vortex effect of the vortex separator and the solid particles tend to travel away from the axis of the separator while the air or other gas is ultimately recirculated through the centrifugal separator 25.

Those skilled in the art will appreciate that various changes and modifications can be made in my invention without departing from the spirit and scope thereof. The foregoing description is given by way of example; the essential characteristics of the invention are defined in the appended claims.

What is claimed is:

1. Apparatus for separating dust from gas comprising a dust collector of the vortex type having a housing of circular cross-section, an inlet for dust-laden gas extending tangentially into said housing near the top thereof, and a central outlet for gas at the upper part of the housing, in combination with a centrifugal separator, the said outlet of the collector constituting the inlet of the centrifugal separator, the centrifugal separator comprising an elongated cylindrical housing extending into the upper part of and projecting upwardly from and coaxially with said collector housing, an impeller coaxially within the cylindrical housing having radially and axially extending vanes, means for driving said impeller, said elongated cylindrical housing having an outlet at the end thereof remote from the collector, means for causing gas to flow into said collector through said cylindrical housing and out of said outlet, whereby rotation of said impeller causes the main flow of gas to travel in a helical path through said cylindrical housing and solid particles to be thrown outwardly toward the inner wall of said housing, there being means associated with the inner wall of the cylindrical housing and extending inwardly therefrom defining a helical path along the inner wall of the cylindrical housing extending to the bottom of said cylindrical housing and being of opposite hand to the helical path taken by the gas passing through said housing whereby gas and solid particles thrown toward said inner wall by said impeller are caused to move downwardly along said path to the bottom end of said housing, said inlet for the centrifugal separator being provided with vanes at the inlet of the separator that impart a rotational motion to gas entering the separator in the same direction as the direction of rotation of the impeller and in the same direction as the rotation of gas in the vortex type collector, there being a passage providing direct communication between the bottom end of said cylindrical housing and the upper portion of said vortex type collector whereby gas in said path and particles separated from the main flow of the gas by said centrifugal separator are returned to said collector.

2. Apparatus according to claim 1 wherein the length of the elongated cylindrical housing is at least three times its internal diameter.

3. Apparatus for separating dust from gas comprising a dust collector of the vortex type having a housing of circular cross-section, an inlet for dust-laden gas extending tangentially into said housing near the top thereof, and a central outlet for gas at the upper part of the housing, in combination with a centrifugal separator, the said outlet of the collector constituting the inlet of the centrifugal separator, the centrifugal separator comprising an elongated cylindrical housing extending into the upper part of and projecting upwardly from and coaxially with said collector housing, an impeller coaxially within the cylindrical housing having radially and axially extending vanes, means for driving said impeller, said elongated cylindrical housing having an outlet at the end thereof remote from the collector, means for causing gas to flow into said collector through said cylindrical housing and out of said outlet, whereby rotation of said impeller causes the main flow of gas to travel in a helical path through said cylindrical housing and solid particles to be thrown outwardly toward the inner wall of said housing, there being means associated with the inner wall of the cylindrical housing and extending inwardly therefrom defining a helical path along the inner wall of the cylindrical housing extending to the bottom of said cylindrical housing and being of opposite hand to the helical path taken by the gas passing through said housing whereby gas and solid particles thrown toward said inner wall by said impeller are caused to move downwardly along said path to the bottom end of said housing, said cylindrical housing having an inlet member supported within the bottom end of said housing and defining an annular passage with the cylindrical housing, and vanes in said annular passage secured with respect to the inner wall of the cylindrical housing and directed to cause the gas and solid particles returned to the collector to rotate in the same direction as the rotation of gas in the vortex type collector.

4. Apparatus for separating dust from gas comprising a dust collector of the cyclone type having a housing having an upper cylindrical portion and a lower portion of inverted conical form, an inlet for dust-laden gas extending tangentially into said cylindrical portion near the top thereof, an outlet for solids that have been separated from the gas at the bottom of the housing, and an outlet for gas opening into the central part of the cylindrical portion at a level below said tangentially extending inlet, in combination with a centrifugal separator, the said outlet of the collector constituting the inlet of the centrifugal separator, the centrifugal separator comprising an elongated cylindrical housing projecting upwardly from and coaxial with said conical housing, an impeller coaxial with the cylindrical housing and having radially extending vanes extending throughout substantially the entire length of the elongated cylindrical housing and parallel to the axis thereof, means for driving said impeller, said cylindrical housing having an outlet at the end thereof remote from the collector, means for causing dust-laden gas to flow into said collector through said cylindrical housing and out of said outlet, whereby rotation of said impeller causes the main flow of gas to travel in a helical path through said cylindrical housing and solid particles to be thrown outwardly against the inner wall of said housing, there being means associated with the inner wall of the cylindrical housing and extending inwardly therefrom defining a helical path extending from the top to the bottom of said cylindrical housing along the inner wall thereof and being of opposite hand to the helical path taken by the main flow of gas passing through said housing, whereby gas in said path and solid particles thrown against said inner wall by said impeller are caused to move downwardly in said path to the bottom end of said housing, said inlet for the centrifugal separator being provided with vanes at the inlet of the separator that impart a rotational motion to gas entering the separator in the same direction as the direction of rotation of the impeller and in the same direction as the rotation of gas in the vortex-type collector, there being a passage providing direct communication between the bottom end of said cylindrical housing and the upper portion of said collector whereby particles separated from the gas by said centrifugal separator are returned to said collector accompanied by the discharge of gas at high velocity.

References Cited

UNITED STATES PATENTS

| 1,165,401 | 12/1915 | Fender | 55—340 |
| 2,453,593 | 11/1948 | Putney | 55—408 |
| 2,588,138 | 3/1952 | McBurney | 55—403 |
| 2,633,930 | 4/1953 | Carter | 55—399 |
| 2,664,966 | 1/1954 | Moore | 55—338 |
| 3,283,480 | 11/1966 | Szego | 55—340 |
| 3,425,192 | 2/1969 | Davis | 55—459 |

FRANK W. LUTTER, Primary Examiner

B. NOZICK, Assistant Examiner

U.S. Cl. X.R.

55—398, 399, 406, 457, 459